US010647003B2

(12) United States Patent
Ban

(10) Patent No.: US 10,647,003 B2
(45) Date of Patent: May 12, 2020

(54) PROGRAMMING DEVICE AND ROBOT CONTROL METHOD

(71) Applicant: FANUC CORPORATION, Yamanashi (JP)

(72) Inventor: Kazunori Ban, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 106 days.

(21) Appl. No.: 15/948,046

(22) Filed: Apr. 9, 2018

(65) Prior Publication Data
US 2018/0333859 A1    Nov. 22, 2018

(30) Foreign Application Priority Data

May 18, 2017    (JP) .................................. 2017-098861

(51) Int. Cl.
*B25J 9/16*    (2006.01)
*B25J 19/02*    (2006.01)

(52) U.S. Cl.
CPC ........... *B25J 9/1697* (2013.01); *B25J 9/1612* (2013.01); *B25J 9/1664* (2013.01); *B25J 19/023* (2013.01);
(Continued)

(58) Field of Classification Search
CPC ...... B25J 9/1612; B25J 9/1664; B25J 9/1697; B25J 19/023; G05B 2219/39484; G05B 2219/39527
See application file for complete search history.

(56) References Cited

U.S. PATENT DOCUMENTS

2018/0194008 A1*  7/2018  Namiki ................. B25J 9/1692
2018/0345493 A1* 12/2018  Kokubo ................ B25J 9/1653
(Continued)

FOREIGN PATENT DOCUMENTS

JP        07-084631     3/1995
JP        2005-138223   6/2005
(Continued)

OTHER PUBLICATIONS

Notification of Reasons for Refusal dated Feb. 12, 2019 in in Japanese Patent Application No. JP 2017-098861.

*Primary Examiner* — Robert T Nguyen
(74) *Attorney, Agent, or Firm* — Wenderoth, Lind & Ponack, L.L.P.

(57) ABSTRACT

To perform a start-up operation of robots more simply than conventionally. A programming device includes: a program generation unit that generates a program for causing a predetermined operation passing through a plurality of movement destination points to be executed by a robot; a robot control unit that causes the predetermined operation to be executed by the robot according to control based on the program; an image acquisition unit that acquires a photographed image capturing a reference point that is arranged at a position having a predetermined relative relationship with a position of the movement destination point; and a movement destination point correction unit that corrects information of the movement destination point included in the program, based on the photographed image and the predetermined relative relationship, in which the robot control unit controls the robot based on corrected information of the movement destination point.

6 Claims, 10 Drawing Sheets

(52) U.S. Cl.
CPC .............. *G05B 2219/39484* (2013.01); *G05B 2219/39527* (2013.01)

(56) References Cited

U.S. PATENT DOCUMENTS

| | | | |
|---|---|---|---|
| 2018/0370027 A1* | 12/2018 | Oota | B25J 9/161 |
| 2019/0035108 A1* | 1/2019 | Inazumi | G06T 7/0004 |
| 2019/0061163 A1* | 2/2019 | Yamaguchi | B25J 9/1664 |
| 2019/0322467 A1* | 10/2019 | Ooba | B25J 9/1697 |

FOREIGN PATENT DOCUMENTS

| | | |
|---|---|---|
| JP | 2006-048244 | 2/2006 |
| JP | 2009-119589 | 6/2009 |
| JP | 2009-208209 | 9/2009 |
| JP | 2015-093356 | 5/2015 |
| JP | 2015-160277 | 9/2015 |
| JP | 2015-211997 | 11/2015 |
| JP | 2017-077614 | 4/2017 |
| WO | 2016/151668 | 9/2016 |

* cited by examiner

EXAMPLE OF VISUAL MARK INDICATING REFERENCE POINT REF
(NO ADDITIONAL INFORMATION)

EXAMPLE OF VISUAL MARK INDICATING REFERENCE POINT REF
(INCLUDES ADDITIONAL INFORMATION)

PROGRAMMING DEVICE AND ROBOT CONTROL METHOD

This application is based on and claims the benefit of priority from Japanese Patent Application No. 2017-098861, filed on 18 May 2017, the content of which is incorporated herein by reference.

BACKGROUND OF THE INVENTION

Field of the Invention

The present invention relates to a programming device and a robot control method for controlling a robot such as an industrial robot.

Related Art

Conventionally, a method called teaching playback for teaching to a robot has been widely employed. With teaching playback, predetermined operations are taught to a robot by moving the robot according to manipulations made by the user using a teaching control panel. Alternatively, predetermined operations are taught to a robot by the user directly pushing and pulling to move the robot. The robot generates an operating program for performing the predetermined operation based on these teachings. Then, by using this operating program, the robot can accurately repeat the predetermined operation even after teaching is completed.

However, performing teaching playback using the actual machine of such a robot on each of a plurality of robots becomes burdensome to the user. Therefore, technology has been utilized that creates an operating program by generating a virtual space on a computer, and then causing the robot to operate virtually in this virtual space. Such technology is disclosed in Patent Document 1, for example, and is called by the title of off-line programming system (hereinafter referred to as "OPS" as appropriate). By utilizing OPS, it becomes possible to generate an operating program without performing teaching playback using the actual machine of a robot.

Patent Document 1: Japanese Unexamined Patent Application, Publication No. 2009-119589

SUMMARY OF THE INVENTION

However, in the case of causing the robot to actually operate using an operating program generated by way of OPS, it is often not possible for the robot to execute the work as expected, for reasons such as dimensional error or assembling error of the robot, or the relative position between the robot and surrounding environment differing from that expected. For this reason, work in which the user performs teaching playback using the actual machine of the robot, and adjusts the operating program generated by way of OPS has been required after all. The teaching and programming performed upon starting up a robot are not easy, and are complicated for the user.

Therefore, the present invention has an object of providing a programming device and robot control method capable of performing the start-up operation of a robot more simply than conventionally.

A programming device (for example, the programming device 10 described later) according to a first aspect of the present invention includes: a program generation unit (for example, the program generation unit 13 described later) that generates a program for causing a predetermined operation passing through a plurality of movement destination points to be executed by a robot (for example, the robot 20 described later); a robot control unit (for example, the robot control unit 14 described later) that causes the predetermined operation to be executed by the robot according to control based on the program; an image acquisition unit (for example, the image acquisition unit 16 described later) that acquires a photographed image capturing a reference point that is arranged at a position having a predetermined relative relationship with a position of the movement destination point; and a movement destination point correction unit (for example, the movement destination point correction unit 15 described later) that corrects information of the movement destination point included in the program, based on the photographed image and the predetermined relative relationship, in which the robot control unit controls the robot based on corrected information of the movement destination point.

According to a second aspect of the present invention, the programming device as described in the first aspect may be configured so that the program generation unit: stores a plurality of movement destination points specified based on information grouping a position of the reference point and the predetermined relative relationship, as candidates for the movement destination point; and selects any movement destination point from the candidates for the movement destination point, and generates a program for causing a predetermined operation passing through the movement destination point thus selected to be executed by the robot, during program generation.

According to a third aspect of the present invention, the programming device as described in the first or second aspect may be configured so that the program generation unit, in a case of the robot and another article interfering if the robot moves between the movement destination points, generates the program by inserting a relay point passed through during movement between the movement destination points, so that the robot moves on a path on which the interfering does not occur.

According to a fourth aspect of the present invention, the programming device as described in the third aspect may be configured so that the movement destination point correction unit does not correct information for the relay point.

According to a fifth aspect of the present invention, the programming device as described in any one of the first to fourth aspects may be configured so that the movement destination point correction unit, while the robot is executing the predetermined operation, corrects information for movement destination points through which the robot subsequently moves.

According to a sixth aspect of the present invention, the programming device as described in any one of the first to fifth aspects may be configured so that a plurality of the reference points is present, and image information for identifying respective reference points is included in each of the reference points; the image acquisition unit also captures image information for identifying the respective reference points; and the movement destination point correction unit identifies a reference point based on image information for identifying the respective reference points, and corrects information of the movement destination point corresponding to the reference point thus identified which is included in the program, based on the photographed image and the predetermined relative relationship.

According to a seventh aspect of the present invention, the programming device as described in any one of the first to sixth aspects may be configured so that, in a case of the robot operating under different conditions, the program generation unit reproduces the program thus generated in a number corresponding to each of the different conditions; and the movement destination point correction unit generates a plurality of corrected programs corresponding to each of the different conditions, by correcting each of the programs thus reproduced to correspond to each of the different conditions.

A robot control method according to an eighth aspect of the present invention, which is performed by a computer (for example, the programming device 10 described later), includes the steps of: generating a program for causing a predetermined operation which passes through a plurality of movement destination points to be executed by a robot; executing the predetermined operation by the robot according to control based on the program; acquiring a photographed image capturing a reference point which is disposed at a position having a predetermined relative relationship with a position of the movement destination point; and correcting information of the movement destination point included in the program, based on the photographed image and the predetermined relative relationship, in which the robot is controlled based on corrected information of the movement destination point, in the step of executing.

According to the present invention, it is possible to perform the start-up operation of a robot more simply than conventionally.

DETAILED DESCRIPTION OF THE INVENTION

Next, an embodiment of the present invention will be explained in detail by referencing the drawings.

Configuration of Embodiment

Figure 1:
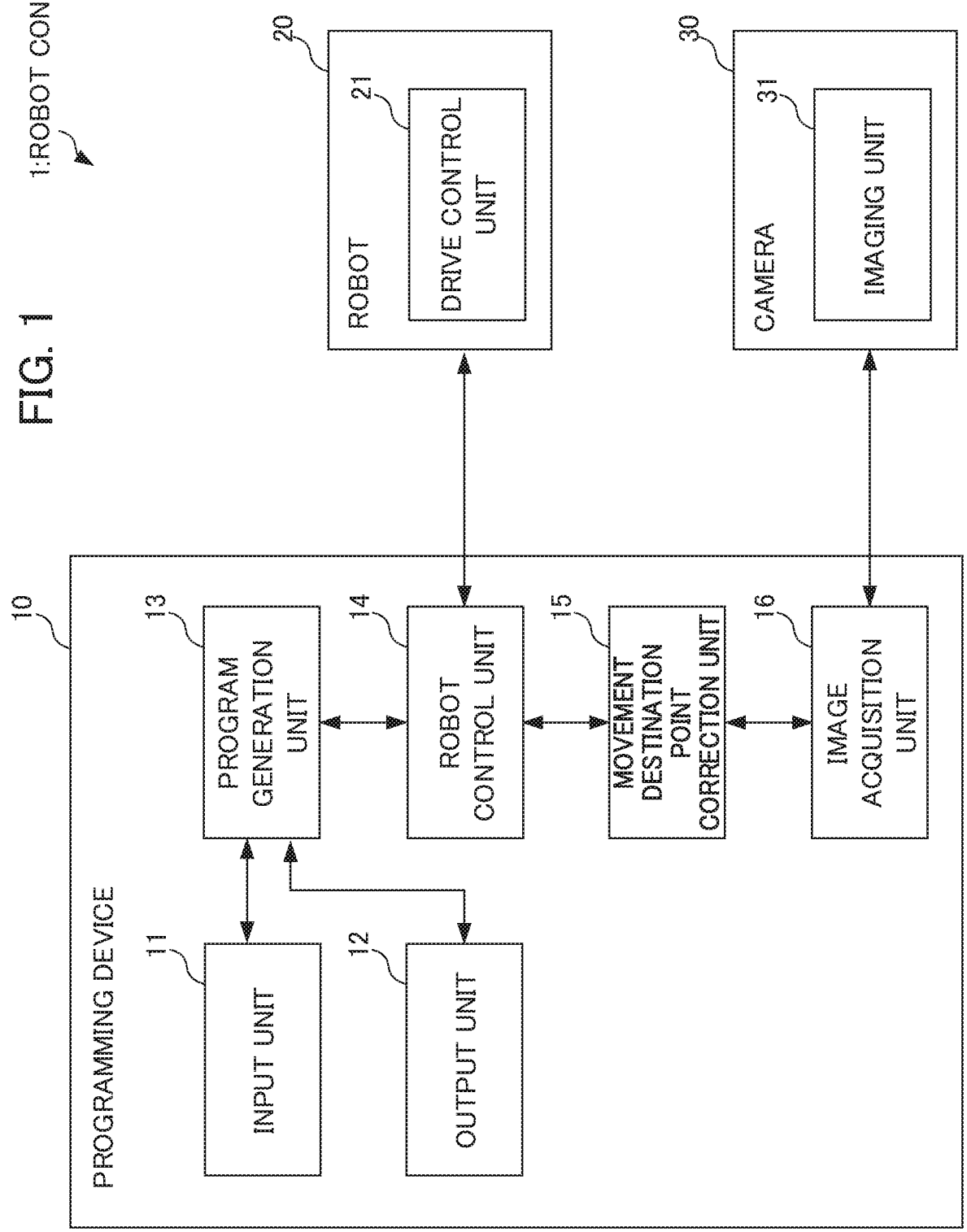
FIG. 1 is a functional block diagram showing the basic configuration of an embodiment of the present invention.

First, the overall configuration of a robot control system 1 which is the present embodiment will be explained by referencing FIG. 1. The robot control system 1 includes a programming device 10, a robot 20 and a camera 30, as shown in FIG. 1.

The programming device 10 and the robot 20 are communicably connected to each other. In addition, the programming device 10 and the camera 30 are also communicably connected to each other. These connections may be wired connections via signal wire, or may be wireless connections. In addition, for example, it may be a connection via networks such as a LAN (Local Area Network) and the Internet. It should be noted that the programming device 10, the robot 20 and the camera 30 include communication units (omitted from illustration) for performing mutual communication by way of such connections.

The programming device 10 is a device for controlling operation of the robot 20. The programming device 10 includes various functional blocks for controlling the operations of the robot 20. It should be noted that the details of the respective functional blocks included by the programming device 10 will be described later. The programming device 10 can be realized by adding the unique functions of the present embodiment to a general programming device (also referred to as "robot controller").

The robot 20 is a robot which operates based on the control of the programming device 10. The robot 20 includes a drive control unit 21 for driving mobile parts such as arms and an end effector based on the control of the programming device 10. The robot 20, for example, can be realized by a general industrial robot which is used in a factory manufacturing automobiles or electronic components.

The camera 30 is a camera which photographs the surroundings of the robot 20. The camera 30 includes an imaging unit 31 for performing photography. The camera 30 can be realized by a general camera such as a CCD (Charge-Coupled Device) camera or CMOS (Complementary Metal Oxide Semiconductor) camera.

In the present embodiment, the programming device 10 generates an operating program for controlling the robot 20 by way of the above configuration. In other words, it becomes possible to generate an operating program without the user performing teaching playback. In addition, with the present embodiment, the programming device 10 controls operation of the robot 20 according to the generated operating program. At this time, positional information of teaching points included in the operating program of the robot is corrected based on images of the surroundings of the robot 20 acquired from the camera 30. With the present embodiment, it thereby becomes possible to raise the precision in the operations of the robot 20 without the user performing teaching playback.

According to the present embodiment, the start-up operation of the robot 20 can be performed in this way without requiring teaching playback by the user. In other words, the present embodiment exerts an effect in being able to perform the start-up operation of a robot more simply than conventionally.

<Functional Blocks Possessed by Programming Device 10>

Next, an explanation will be made for the functional blocks possessed by the programming device 10. The programming device 10 is configured to include an input unit 11, an output unit 12, a program generation unit 13, a robot control unit 14, a movement destination correction unit 15 and an image acquisition unit 16, as shown in FIG. 1.

The input unit 11 is a portion that receives various manipulations from the user, and receives input of contents of the work procedure manual from the user. Herein, contents of the work procedure manual is a term indicating the contents of a plurality of predetermined jobs to be performed by the robot 20, and the sequence in which to perform the plurality of predetermined jobs. The input format of the contents of the work procedure manual is not particularly limited. For example, although the contents of the work procedure manual may be inputted in a format following the programming language, it is preferable if the contents of the work procedure manual are inputted in a format that can be easily understood by the user. For example, it is preferable if configuring so as to be inputted in a format of the flowchart as described later. The inputted contents of the work procedure manual are outputted to the program generation unit 13. The input unit 11 is realized by an input device such as a keyboard and mouse, or a touch panel, for example.

The output unit 12 is a portion that outputs a user interface for the user to perform various manipulations, and for the user to input the contents of the work procedure manual. The output unit 12 may additionally output information other than the user interface, such as information showing the driving conditions of the robot. The output unit 12 is realized by way of a display device such as a liquid crystal display.

The program generation unit 13 is a portion that generates an operating program for causing the robot 20 to operate, by performing off-line programming. The program generation unit 13 outputs the interface for the user to input the contents of the work procedure manual from the output unit 12. Then, the program generation unit 13 generates the operating program based on the contents of the work procedure manual received by the input unit 11 from the user having referenced the user interface. The generated operating program is outputted to the robot control unit 14.

Generation of the operating program can be performed by employing technology disclosed in "Japanese Unexamined Patent Application, Publication No. H9-167007" or like, for example. However, the program generation unit 13 generates an operating program by a method which is partly different from such general technology. More specifically, the program generation unit 13, before generation of the operating program, creates several candidates for points to pass through in operation of the robot 20. In addition, the program generation unit 13 makes general classifications into the two of points requiring relative precision upon determining the teaching points through which the robot 20 actually passes (hereinafter referred to as "point" as appropriate), and points not requiring relative precision, based on the contents of the work procedure manual. Then, from among the candidates of points created in advance for the former of points requiring relative precision, selections and made and joined. In addition, for latter of points not requiring relative precision, any point believed to be appropriate is determined, and inserted as a relay point, without selecting from among the candidates of points created in advance.

For movement destination points requiring relative precision, it is thereby possible to satisfy this required precision. In addition, for points not as such, it is possible to arbitrarily select a point to smoothly link between movement destination points. It should be noted that the detailed contents of generation of the operating program by the program generation unit 13 will be described later by referencing FIGS. 2 to 4.

The robot control unit 14 is a portion that controls operation of the robot 20 based on the operating program inputted from the program generation unit 13. More specifically, the robot control unit 14 generates a signal for controlling operation of the robot 20 based on the operating program, and outputs the generated signal to the drive control unit 21 possessed by the robot 20. The drive control unit 21 performs control for driving the mobile parts such as the arm and end effector according to this signal. It is thereby possible for the robot 20 to perform predetermined jobs in a predetermined sequence following to the contents of the work procedure manual.

The image acquisition unit 16 acquires photographed images capturing the surroundings of the robot 20 performing operations according to the contents of the work procedure manual in the above-mentioned way from the camera 30. It should be noted that photography is performed by the imaging unit 31 equipped to the camera 30 in the aforementioned way. The image acquisition unit 16 outputs the acquired photographed image to the movement destination point correction unit 15.

The movement destination point correction unit 15 corrects the positional information for a point requiring relative precision, among the point that should be passed through included in the operating program of the robot, based on the photographed image of the surroundings of the robot 20 acquired from the camera 30. Then, the corrected positional information is outputted to the robot control unit 14. The robot control unit 14 corrects the operating program based on the corrected positional information, and controls the operation of the robot 20 according to the corrected operating program. It should be noted that the detailed contents of correction of the positional information by the movement destination point correction unit 15 will be described later by referencing FIGS. 5 to 9.

By each of the functional blocks explained above cooperating, it becomes possible to generate an operating program, as well as control the operation of the robot 20 with high precision, without requiring adjustment of the operating program by the user.

Next, an explanation will be made for the realization method of these functional blocks equipped to the programming device 10. The programming device 10 includes an arithmetic processing device such as a CPU (Central Processing Unit). In addition, the programming device 10 includes an auxiliary storage device such as ROM (Read Only Memory) or a HDD (Hard Disk Drive) storing various control programs, and a main storage device such as RAM (Random Access Memory) for storing data which is temporarily necessitated upon the arithmetic processing unit executing programs.

Then, in the programming device 10, the arithmetic processing unit reads OS and/or application software from the auxiliary storage device, and performs arithmetic processing based on this OS and/or application while expanding the read OS and/or application software in the main storage device. In addition, based on this computation result, each piece of hardware equipped to the programming device 10 is controlled. The processing by the aforementioned functional blocks is thereby realized. In other words, the programming device 10 can be realized by hardware and software cooperating.

<Generation of Operating Program>

Next, an explanation will be made for the details of generation of the operating program by the program generation unit 13. First, the operations of the robot 20 which serve as the premise for creation of the operating program will be explained. The matter of performing any job by the robot 20 making movement can be perceived as the robot 20 exerting any effect on an article in the vicinity thereof irrespective of being contact/non-contact. This effect includes grasping (for example, holding of an article), opening (for example, placing retained article somewhere), sandwiching (interposing two plates so as to spot weld), rotating (for example, fastening a screw, fitting together articles, etc.), making relative movement (for example, cutting by a cutting tool or laser beam, welding together articles, etc.) and the like.

The instant at which exerting this effect, it is necessary to perform an operation of positioning the end effector of the robot 20 at a predetermined relative position, in relation to the article serving as the target of exerting the effect. The operation of positioning at this predetermined relative position will be explained by referencing the illustrated example shown in FIG. 2.

Figure 2:
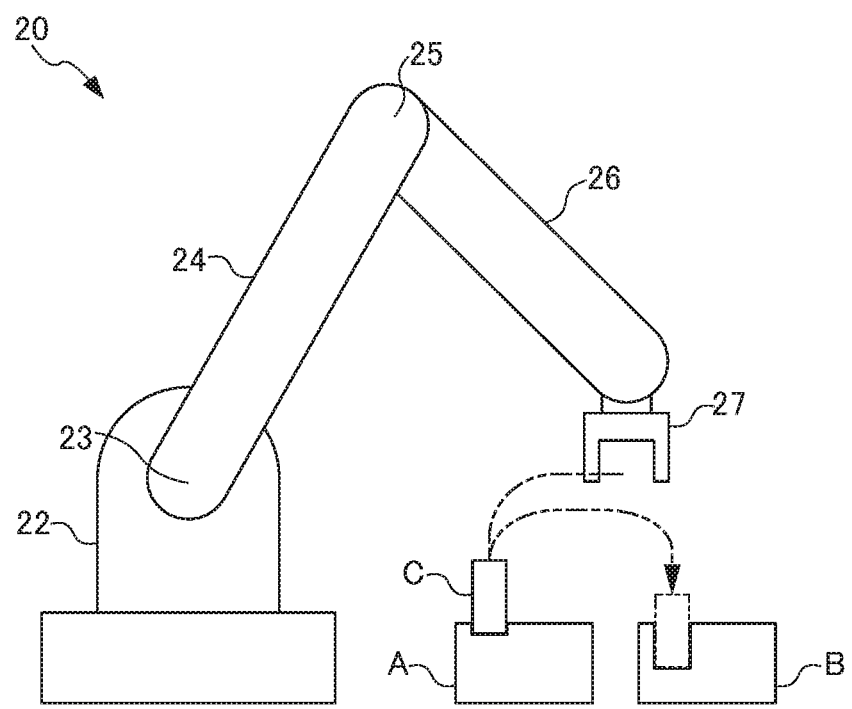
FIG. 2 is a schematic diagram (1/2) for explaining the generation of an operating program in the embodiment of the present invention.

As shown in FIG. 2, two independent articles A and B are present in the vicinity of the robot 20 in the present example. In addition, article C is placed on article A. Then, the robot 20 grips and lifts article C which is placed on article A, while moving on a trajectory such as that shown by the dotted line in the drawing, and assembles the lifted article C into the concave part of B. Although this example of FIG. 2 is illustrated, any action performed by the robot 20 is considered to be matter made by expanding upon this example of FIG. 2 and including variation.

In order to perform such operation, the robot 20 includes a base part 22, a first joint 23, a first arm 24, a second joint 25, a second arm 26 and a gripper 27. The robot 20 of the present example is configured as an articulated robot including the first arm 24 and second arm 26 mounted to the base part 22, and the first joint 23 and second joint 25 which are joints for moving these arms.

The robot 20 can freely change the position and posture of the gripper 27, which is the end effector held to the wrist part of the second arm 26, by rotating the base part 22 about an axis in the vertical direction, and moving and rotating the first arm 24 and second arm 26 by way of the first joint 23 and second joint 25. The robot 20 can thereby arrange a work (for example, article C) gripped by the gripper 27 at a predetermined position and posture. The driving of the base part 22, first joint 23, second joint 25, gripper 27, etc. in this case is realized according to control by the drive control unit 21 shown in FIG. 1. It should be noted that the structure and control of an articulated robot such as the robot 20 are well known to those skilled in the art; therefore, a more detailed explanation than this will be omitted.

Figure 3:
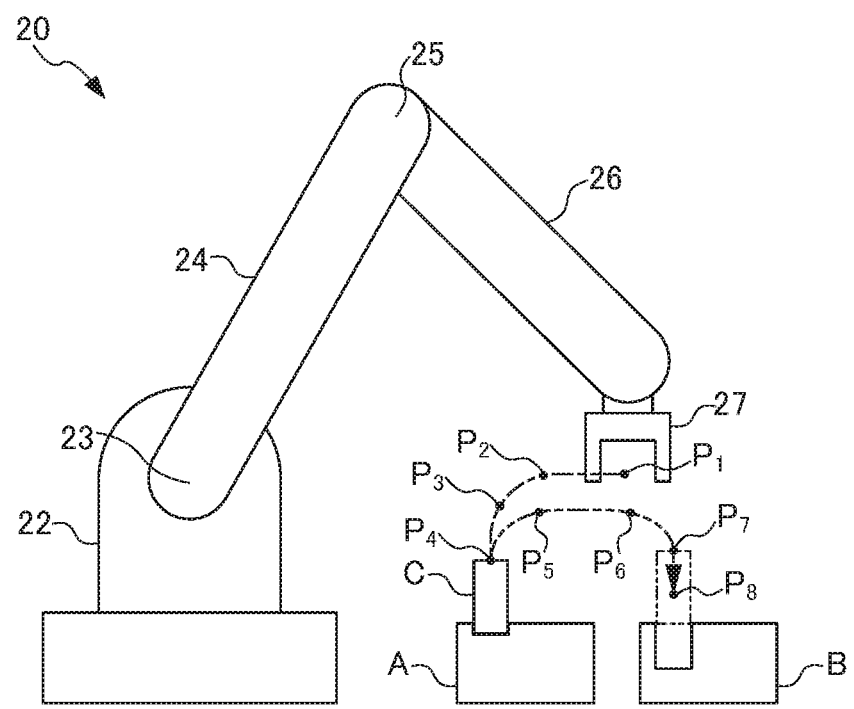
FIG. 3 is a schematic diagram (2/2) for explaining the generation of an operating program in the embodiment of the present invention.

In the case of driving the robot 20 taking such a configuration as example to realize the motion explained by referencing FIG. 2, points through which the gripper 27 of the robot 20 passes become points $P_1$ to $P_8$ shown in FIG. 3, for example. Herein, the present embodiment divides these points into mainly two types.

One are points for which the relative position is fixed in relation to article A or article B, and relative high precision is demanded. Hereinafter, such points are called "movement destination points". If being the present example, points $P_4$, $P_7$ and $P_8$ correspond to movement destination points. The other ones are points which are passed through for reaching points $P_4$, $P_7$, $P_8$, etc., and may be low positional accuracy to an extent so long as the respective parts of the robot 20 do not interfere with the surroundings. Hereinafter, such a point will be called "relay point". It should be noted that this relay point also may be called by names such as air-cut point, generally. If being the present example, the points $P_1$, $P_2$, $P_3$, $P_5$ and $P_6$ correspond to relay points.

In the present embodiment, the user inputs the operating sequence corresponding to the contents of the work procedure manual using the input unit 11 in the format of a flowchart. Normally, the contents of the operating sequence will be a list of the details of any action, while the robot 20 imparts this action on the article accompanying relatively high precision positioning. For example, in the case of expressing the operating sequence of FIG. 3 in the format of a flowchart, it will be as in the flowchart shown in FIG. 4.

Figure 4:
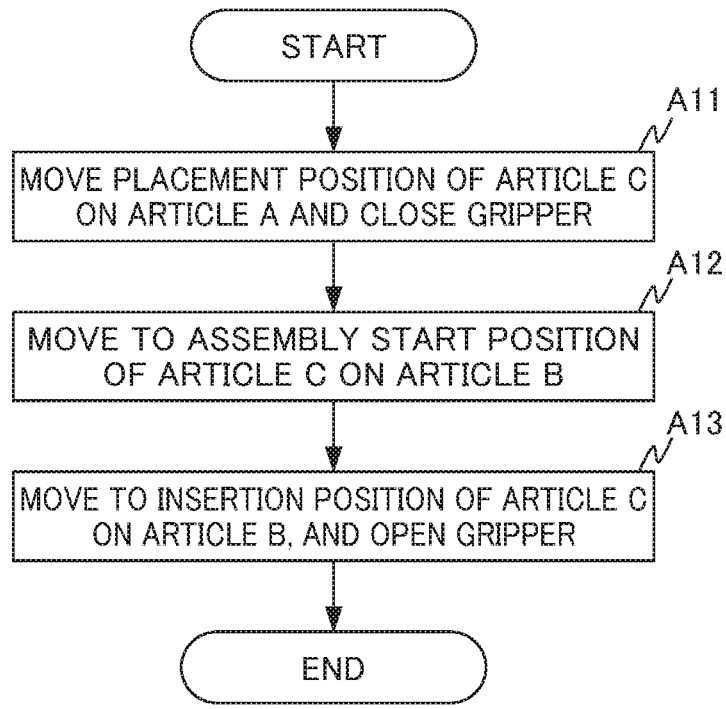
FIG. 4 is a flowchart according to contents of an work procedure manual inputted for generating an operating program in the embodiment of the present invention.
Figure 5:
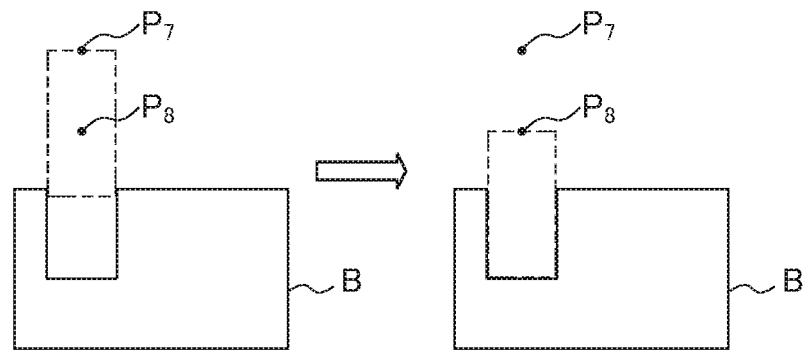
FIG. 5 is a schematic diagram for explaining correction of an operating program in the embodiment of the present invention.

Herein, Step A11 in FIG. 4 is an operating sequence of moving to a position for placing article C on article A and closing the gripper. This, as operation of the robot 20, is the matter of moving the gripper 27 to point $P_4$, and closing the gripper 27.

In addition, Step A12 is the operating sequence of moving to the assembly start position of article C on article B. This, as the operation of the robot 20, is the matter of moving the gripper 27 to point $P_7$, while leaving the gripper 27 closed.

Step A13 is the operating sequence of moving article C on article B to the insertion position, and opening the gripper 27. This, as the operation of the robot 20, is the matter of moving the gripper 27 to point $P_8$, and opening the gripper 27.

In this regard, normally, unless there is a special need, a description corresponding to points $P_2$, $P_3$, $P_5$ and $P_6$ will be omitted.

Then, in the present embodiment, the position of point P4 relative to article A is defined in advance, and the points of points P7 and P8 relative to article B are defined in advance. In addition, the posture of the gripper 27 relative to article A or article B at each point is defined and storage along with this. Besides, for example, the positions of point $P_{10}$, which is a position higher than point $P_7$, and the position relative to article B of point $P_{11}$, which is a position higher than point $P_{10}$, are defined, and then the posture of the gripper 27 relative to article B at each point is defined and stored along with these. By preparing and storing several definitions for such points and postures, these become elements, i.e. movement destination points, constituting the operating program.

Then, in the case of the work procedure manual being designated in the format of a flowchart such as that of FIG. 4, for example, the defined points corresponding to each step are extracted. For example, based on the size, etc. of article C, any of points $P_7$, $P_{10}$ and $P_{11}$ are selected, and extracted as defined points corresponding to Step A12. For example, since article C is large, in the case of article C and article B coming into contact if moving article C to point PT, point $P_{10}$ or point $P_{11}$ will be selected rather than point $P_7$. In the present example, point $P_7$ is extracted as the defined point corresponding to Step A12. Then, when linking the defined points corresponding to each step thus extracted, the minimal required operating program will be generated.

Herein, what is stored is information of the relative positions of points $P_4$, $P_7$, $P_8$, etc. in relation to article A or article B, and the posture of the gripper 27. In the case of changing the arrangement of article A or article B relative to the robot 20, the numerical values for the actual position/posture of points $P_4$, $P_7$, $P_8$, etc. relative to the robot 20 will change in response thereto; however, the information for the relative positions of points $P_4$, $P_7$, $P_8$, et c. in relation to article A or article B and the posture of the gripper 27 which are stored will not change. More specifically, the above-mentioned movement destination points are stored in combination as shown in Table 1 described below.

TABLE 1

| Type | Reference | Movement destination point information |
| --- | --- | --- |
| Placement position of article C on article A | Article A | $(X_4, Y_4, Z_4, W_4, P_4, R_4)$ |
| Assembly start position of article C on article B | Article B | $(X_7, Y_7, Z_7, W_7, P_7, R_7)$ |
| Insertion position of article C on article B | Article B | $(X_8, Y_8, Z_8, W_8, P_8, R_8)$ |

It should be noted that it will not be the operating program actually functioning by simply the listing of movement destination points as described above. Therefore, points $P_2$, $P_3$, $P_5$ and $P_6$ are inserted as appropriate as relay points such that smoothly link between the movement destination points. The relay points are selected so that each part of the robot 20 will not interfere and collide with the surroundings in the course of movement. The insertion of such relay points, for example, can be realized by employing the technology disclosed in "Japanese Unexamined Patent Application, Publication No. 2015-160277", or the like.

As explained above, according to the present embodiment, the relay points between movement destination points are inserted as appropriate, along with the movement destination points requiring relative precision corresponding to each step of the work procedure being selected in a form lining up, by way of the off-line programming by the program generation unit 13. It thereby becomes possible to automatically generate an operating program for executing a work procedure inputted from the user in a format such as a flowchart. In addition, a plurality of the movement destination points are prepared, and relay points can be arbitrarily selected; therefore, it becomes possible to generate an operating program by generically applying to various work procedures.

<Correction of Operating Program>

Next, an explanation will be made for the details of correction of the operating program performed by the movement destination point correction unit 15. Hereinafter, an example of correction for points $P_7$ and $P_8$, which have a correlation with article B, will be explained.

In order to perform work such as assembling article C to article B, the two of point $P_7$, which is the assembly starting point, and point $P_8$ as a lower end at which ending insertion of article C, are defined in advance as movement destination points, and stored. The positions of the two points are in a relationship such that the relative position in relation to article B is fixed, and are connected to move together with article B. Therefore, it is possible to decide the actual movement destinations of point $P_7$ and point $P_8$, by knowing where article B exists relative to the robot 20.

Figure 6:
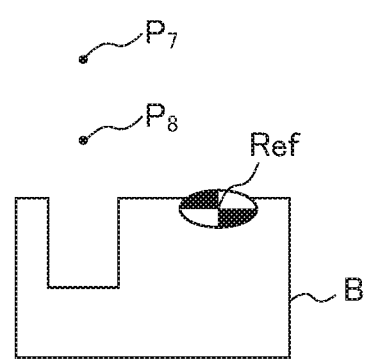
FIG. 6 is a schematic diagram for explaining correction of an operating program in the embodiment of the present invention.

Then, in the present embodiment, the camera 30 is used as a visual sensor for "knowing where article B exists relative to the robot 20". More specifically, as shown in FIG. 6, a reference point Ref such that capturing is possible by the camera 30 is arranged beforehand on the article on which a relative movement destination point is defined such as article B. For example, as a reference point Ref, a visual mark sticker such that capturing is possible by the camera 30 is pasted on the article B. In addition, the reference point Ref is defined at the same location of article B in virtual space used for generating the operating program in the program generation unit 13.

Figure 7:
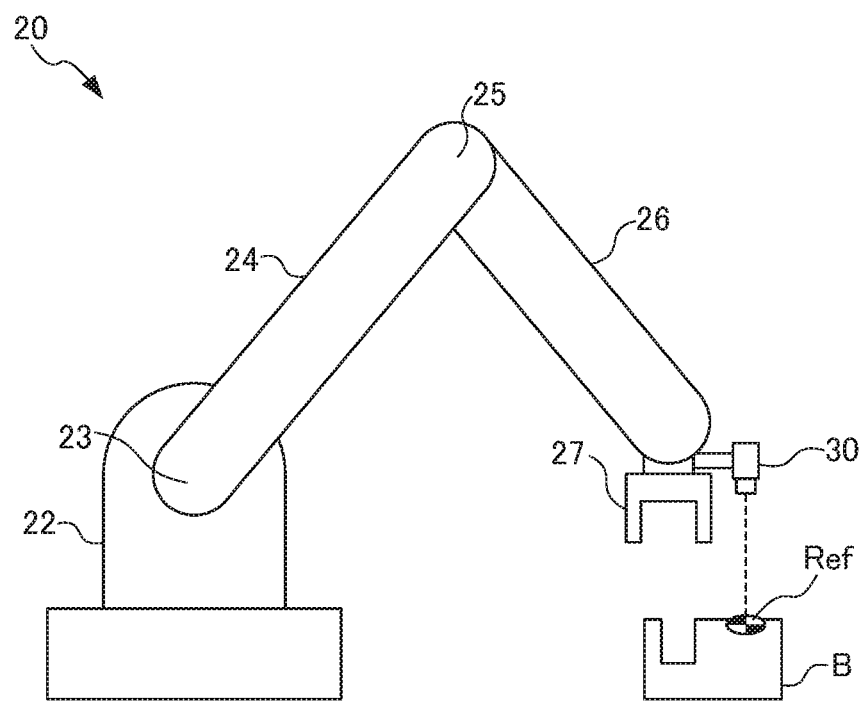
FIG. 7 is a schematic diagram for explaining correction of an operating program in the embodiment of the present invention.

Then, as shown in FIG. 7, the camera 30 is fixedly installed at the appropriate location such as the leading end of the second arm 26 of the robot 20, and the robot 20 is controlled so that the relative relationship between the reference point Ref and camera 30 becomes a predetermined state based on the photographed images captured by this camera 30.

Figure 8:
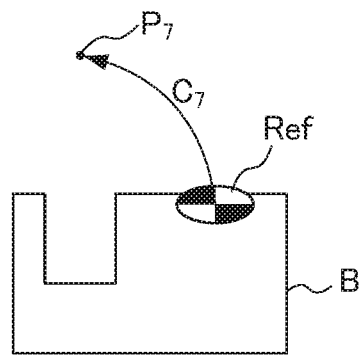
FIG. 8 is a schematic diagram for explaining correction of an operating program in the embodiment of the present invention.

The matter of the relative relationship between the reference point Ref and camera 30 entering a predetermined state indicates the matter of the relative relationship between the reference point Ref and the gripper 27 of the robot 20 also becoming a certain fixed value. Such processing can be realized by employing the technology disclosed in "Japanese Unexamined Patent Application, Publication No. 5850962", for example. When the reference point Ref is defined as shown in FIG. 8 relative to article B, for example, the relative relationship between the reference point Ref and point $P_7$ ($C_7$ in the drawing) becomes known. Therefore, it is possible to create Table 2 listed below, exemplifying the movement destination points previously described in above-mentioned Table 1.

TABLE 2

| Type | Reference | Movement destination point information |
| --- | --- | --- |
| Placement position of article C on article A | Article A = RefA | $(X_4, Y_4, Z_4, W_4, P_4, R_4) = C_4$ |
| Assembly start position of article C on article B | Article B = RefB | $(X_7, Y_7, Z_7, W_7, P_7, R_7) = C_7$ |
| Insertion position of article C on article B | Article B = RefB | $(X_8, Y_8, Z_8, W_8, P_8, R_8) = C_8$ |

Figure 9:
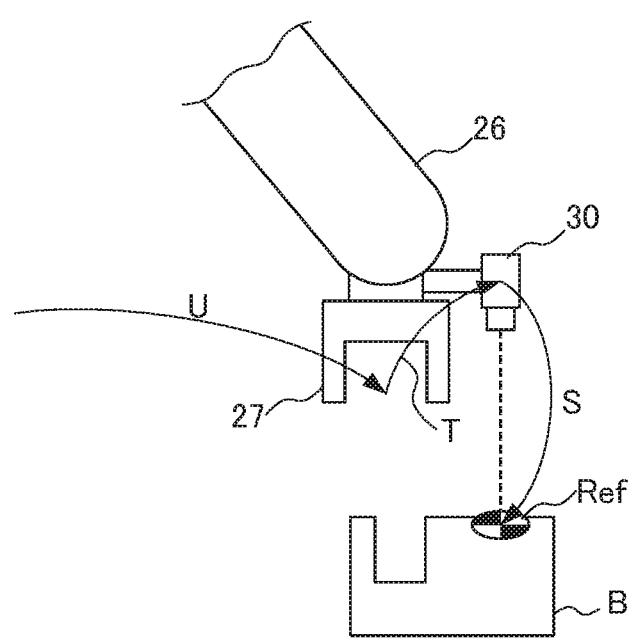
FIG. 9 is a schematic diagram for explaining correction of an operating program in the embodiment of the present invention.

It should be noted that, as shown in FIG. 7, in the case of using a method whereby the relative relationship between the reference point and camera enters a predetermined state, it is necessary to perform one type of calibration for acquiring data for this "relative relationship between reference point Ref and camera 30 is predetermined state" by simply the first time in the actual system on the factory floor. This calibration operation will be explained below. FIG. 9 is a view showing the state in which the above-mentioned "relative relationship between reference point Ref and camera 30 is predetermined state" is realized. Herein, U, T and S shown in FIG. 9 indicate each of the following. U: position-posture information of gripper 27 relative to (reference position of) robot 20

(This is generally acquirable at any time as data representing the current position of the robot leading end part for a device called a robot controller)

T: relative relationship information between gripper 27 and camera 30 (unknown value)

S: relative relationship information between camera 30 and reference point Ref (unknown value)

It should be noted that the points $P_1$ to $P_8$, $C_4$ to $C_8$, S, T, U, etc. appearing thus far correspond to the position-posture information represented by the homogeneous transformation matrix expressed in 4×4 below.

$$X = \begin{pmatrix} n_x & o_x & a_x & l_x \\ n_y & o_y & a_y & l_y \\ n_z & o_z & a_z & l_z \\ 0 & 0 & 0 & 1 \end{pmatrix} \quad \text{[formula 1]}$$

As a specific operation during calibration, the value of U is first acquired in the state of FIG. 9. Next, the robot 20 is actually positioned at the point $P_7$ (or point $P_8$) shown in FIG. 6, and the position-posture information of the gripper 27 relative to the reference position of the robot 20 at this time is acquired. In other words, the value of point $P_7$ is acquired. The information acquired in this way satisfies the following equation. It should be noted that Inv(X) indicates the inverse matrix of the homogeneous transformation matrix.

$$P_7 \cdot Inv(C_7) = U \cdot T \cdot S$$

The unknown values T·S are obtained from this equation. This is expressed as Q. $T \cdot S = Inv(U) \cdot P_7 \cdot Inv(C_7) \equiv Q$ Afterwards, in the case of wanting to move the robot 20 to any movement destination point (movement destination point defined relative to any article X, this is written as $C_x$ herein), a state such as that in FIG. 7 relative to the reference point (=RefX) on this article is first created using the camera 30, and the position-posture Ux of the gripper 27 at this time is acquired. When this is done, since the following relational expression holds true, $$P_x \cdot Inv(C_x) = U_x \cdot T \cdot S = U_x \cdot Q,$$

it is possible to derive $P_x = U_x \cdot Q \cdot C_x$. Then, if moving the robot 20 to $P_x$ by correcting the positional information of the operating program based on this derived formula, the actual robot 20 on the factory floor will move to the desired position.

As explained above, according to the present embodiment, on the factory floor on which the robot 20 is actually installed, by completing the aforementioned such calibration operation beforehand, the reference point Ref of a peripheral article is automatically measured by the camera 30 fixed to the leading end part of the second arm 26, and the robot control unit 14 performs correction based on this; therefore, operation of the robot 20 corresponding to the work procedure manual is realized.

Operations of Present Embodiment

Figure 10:
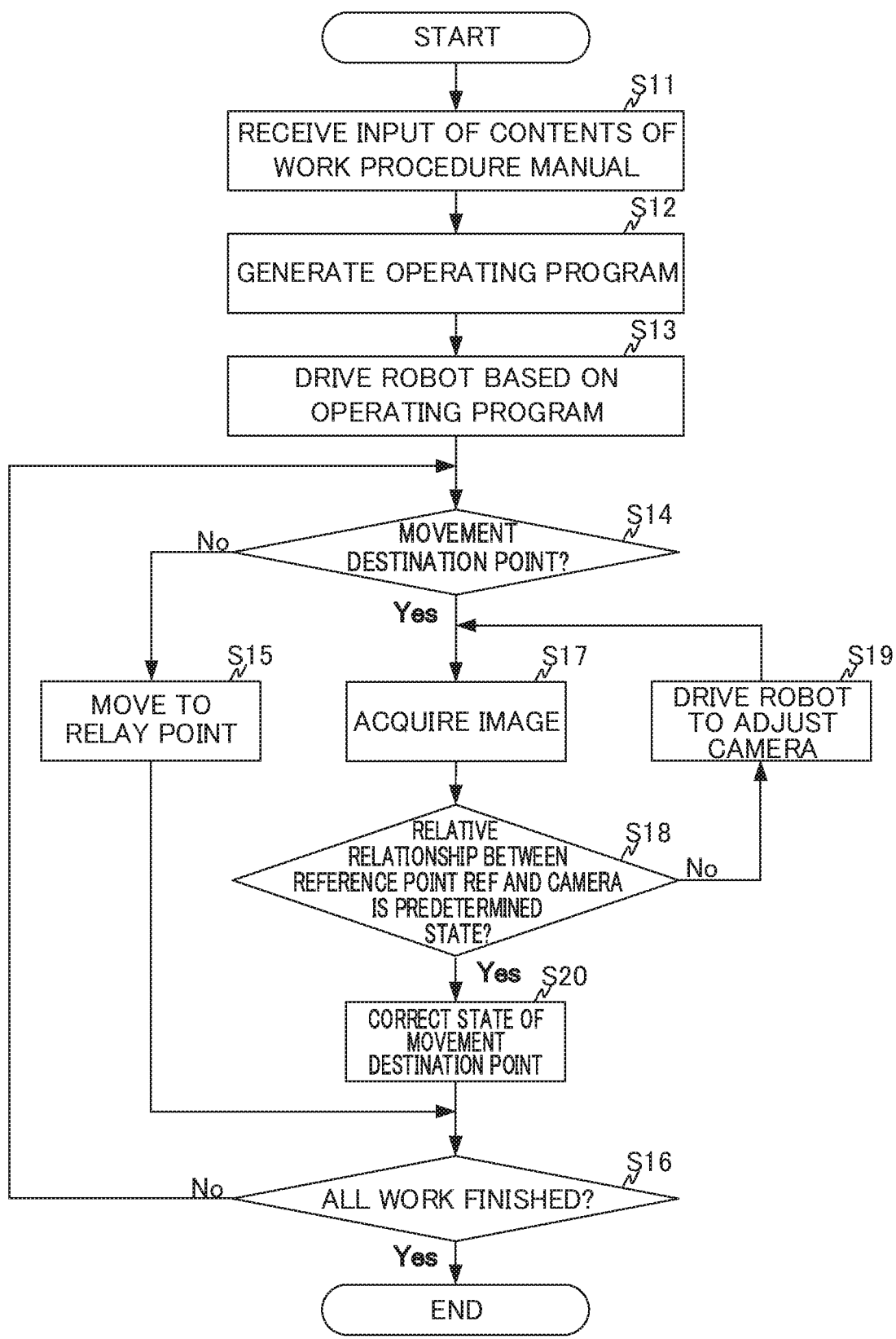
FIG. 10 is a flowchart showing a configuration illustrating the basic operations in the embodiment of the present invention.

Next, an explanation will be made for the operations of the present embodiment by referencing the flowchart of FIG. 10. In Step S11, the input unit 11 accepts input of the contents of the work procedure manual from the user.

In Step S12, the program generation unit 13 generates an operating program based on the work procedure manual accepted in Step S11. The specific generation method is as mentioned above in the section of <Generation of Operating Program>.

In Step S13, the robot control unit 14 generates a signal for control based on the operating program generated in Step S12. Then, the robot control unit 14 outputs the signal for control thus generated to the drive control unit 21. The drive control unit 21 drives the mobile part of the robot 20 based on this signal for control. The robot 20 thereby starts operation according to the operating program.

In Step S14, upon the robot control unit 14 performing movement to any point (teaching point), it is determined whether the gripper 27 has moved to the neighborhood of any movement destination point. In the case of not having moved to the neighborhood of a movement destination point, it is determined as NO in Step S14, and the processing advances to Step S15. Then, in Step S15, the gripper 27 moves to a predetermined relay point. In Step S16, the robot control unit 14 determines whether or not the entire work procedure included in the operating program has completed. In the case of the work procedure still not being entirely completed, it is determined as NO in Step S16, and the processing returns to Step S14. Then, the processing from Step S14 is repeated. On the other hand, in the case of the entire work procedure having completed, it is determined as YES in Step S16, and the processing ends. In the case of the gripper 27 having moved to the neighborhood of any movement destination point, it is determined as YES in Step S14, and the processing advances to Step S17. In Step S17, the movement destination point correction unit 15 acquires the photographed image of the neighborhood of the movement destination point captured by the imaging unit 31 via the image acquisition unit 16.

In Step S18, based on the photographed image acquired in Step S17 by the movement destination point correction unit 15, it is determined whether the relative relationship between the reference point Ref and camera has entered a predetermined state. In the case of the relative relationship between the reference point Ref and camera not having entered the predetermined state, it is determined as NO in Step S18, and after adjusting the position of the camera by driving the robot in Step S19, the processing returns to Step S17. Then, the determination of Step S18 is performed again. In the case of the relative relationship between the reference point Ref and camera having entered the predetermined state, it is determined as YES in Step S18, and the processing advances to Step S20.

In Step S20, the movement destination point correction unit 15 performs correction on the positional information included in the operating program, based on the position-posture information (said $U_x$) of the gripper 27 at the moment when determined as YES in Step S18, the information of the movement destination point (said $C_x$) defined relative to the reference point Ref, and information of the relative relationship (said Q) obtained in advance by the aforementioned calibration. The specific correction method is as mentioned above in the section of <Correction of Operating Program>. The gripper 27 can thereby move accurately to the movement destination point.

In Step S16, the robot control unit 14 determines whether the entire work procedure included in the operating program has completed. In the case of the entire work procedure still not being completed, it is determined as NO in Step S16, and the processing returns to Step S14. Then, the processing is repeated from Step S14. On the other hand, in the case of the entire work procedure having completed, it is determined as YES in Step S16, and the processing ends.

Afterwards, by the programming device 10 controlling the robot 20 using the operating program corrected according to this processing, it becomes possible to repeatedly perform a predetermined work procedure according to the work procedure manual by the robot 20.

According to the present embodiment explained above, the user can generate an operating program by simply inputting the contents of the work procedure manual. In addition, subsequently, since the robot control unit 14 performs correction automatically, it becomes such that the operating program of the robot 20 runs with high precision.

In other words, it is possible to eliminate the labor for adjusting the operating program by the user according to teaching playback.

In addition, according to the present embodiment, correction processing done using visual marks corresponding to the reference point Ref by the movement destination point correction unit 15 is unnecessary for the relay points. For this reason, it is possible to reduce the number to install visual marks compared to a case of installing visual marks for every point among the movement destination points and relay points. In other words, it is possible to also eliminate the labor for installing visual marks by the user.

In this way, in the present embodiment, the intervention of manual labor into the series of processes starting from off-line program is much less. In other words, according to the present embodiment, it is possible to perform the start-up operation of the robot more simply than conventionally.

It should be noted that each of the respective devices included in the above-mentioned robot control system can be realized by way of hardware, software or a combination of these. In addition, the robot control method performed by way of each of the respective devices included in the above-mentioned robot control system cooperating can also be realized by way of hardware, software or a combination of these. Herein, being realized by software indicates the matter of being realized by a computer reading out and executing programs. The programs can be stored using various types of non-transitory computer readable media, and supplied to a computer. The non-transitory computer readable media includes tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and implementation is possible in modes achieved by conducting various modifications in a scope not departing from the gist of the present invention. For example, it may be configured so as to realize part of the functions of the programming device 10 by a personal computer or the like.

In other words, it may be configured so as to realize the programming device 10 by a robot controller and a personal computer. In addition, for example, it may be configured so as to apply modifications like those of the following <Modified Examples>.

Modified Examples

In the aforementioned embodiment, the reference point Ref such that it is possible to capture by the camera 30 is arranged beforehand on article A or article B, as explained by referencing FIGS. 6 to 9 in the section of <Correction of operating Program>. For example, as the reference point Ref, a visual mark such that can be captured by the camera 30 is pasted on article A or article B, respectively, as a sticker or the like. In addition, these reference points Ref and data corresponding thereto are stored to be associated as shown in Table 2, and correction of the operating program is performed using this data.

Herein, in a case such that the reference point corresponding to article A (hereinafter defined as "reference point $Ref_A$") and the reference point corresponding to article B (hereinafter defined as "reference point $Ref_B$") are at positions spaced by a certain extent, the camera 30 installed to the robot 20 operating based on the operating program will photograph the reference point $Ref_A$, then move and further photograph the reference point $Ref_B$. For this reason, the movement destination point correction unit 15, after recognizing the reference point first photographed as being reference point $Ref_A$ and performing correction, can then recognize the reference point photographed next as being reference point $Ref_B$, and perform correction.

However, in a case such that reference point $Ref_A$ and reference point $Ref_B$ are installed in proximity, or a case of being installed in the same direction from the camera 30, for example, reference point $Ref_A$ and reference point $Ref_B$ may be photographed simultaneously. In this way, in a case such that reference point $Ref_A$ and reference point $Ref_B$ are photographed simultaneously, the movement destination point correction unit 15 cannot distinguish between the two reference points Ref.

Figure 11A:
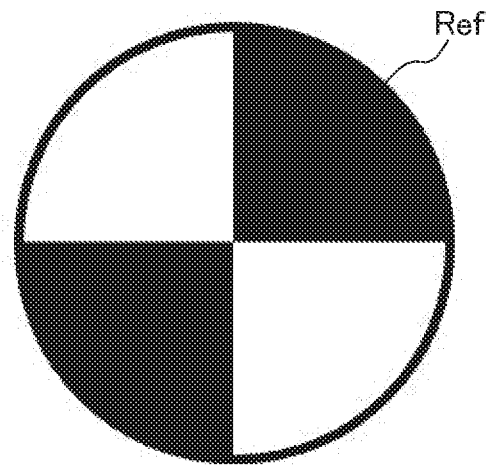
FIG. 11A is a schematic diagram showing an example of a reference point Ref in the embodiment of the present invention.

Therefore, in the present modified example, additional information for discerning between the reference point $Ref_A$ and reference point $Ref_B$ is applied to each of the visual marks corresponding to reference point $Ref_A$ and reference point $Ref_B$. This point will be explained by referencing FIG. 11A and FIG. 11B. First, FIG. 11A shows an example of a visual mark indicating the reference point Ref, which is an example of a visual mark not adding the above-mentioned such additional information. The movement destination point correction unit 15 acquires the visual mark such as the example of FIG. 11A from the imaging data, whereby it is possible to specify the position of the reference point Ref.

Figure 11B:
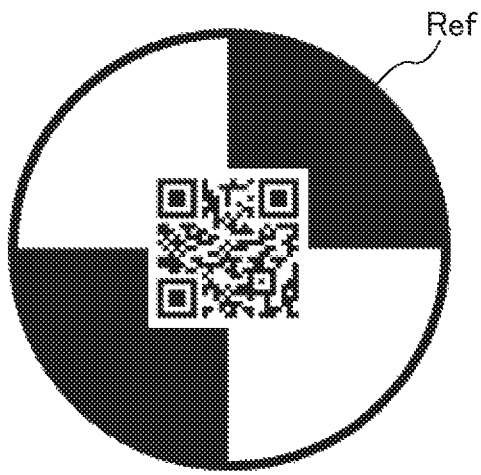
FIG. 11B is a schematic diagram showing another example of a reference point Ref in the embodiment of the present invention.

On the other hand, FIG. 11B shows an example of a visual mark indicating the reference point Ref, which is an example of a visual mark to the above-mentioned such additional information is added. In the present example, binary code representing logic information such as letters is added to the visual mark as additional information. The movement destination point correction unit 15 can acquire visual marks such as the example in FIG. 11B from the imaging data, whereby it is possible to not only specify the position of the reference point Ref, but also acquire logic information such as letters by analyzing the binary code. Then, this logic information is used as identification information for identifying the reference point $Ref_A$ and reference point $Ref^B$, for example. In this case, the relationship of each reference point Ref with this identification information is also associated in the data corresponding to Table 2, and stored.

The movement destination point correction unit 15 can thereby identify to which article the reference point Ref corresponds by the figure of the visual mark sticker of the reference point Ref currently photographed by the camera 30.

In other words, according to the present modified example, it exerts an effect in being able to reliably specify what the article captured by the camera 30 is. It should be noted that it may be configured so as to further modify the present modified example to add logic information in a form other than binary code. In addition, it may be configured so as to include the movement destination point information, etc. of Table 2 in the logic information, and acquire this by the movement destination point correction unit 15.

Application Example of Present Embodiment

Figure 12:
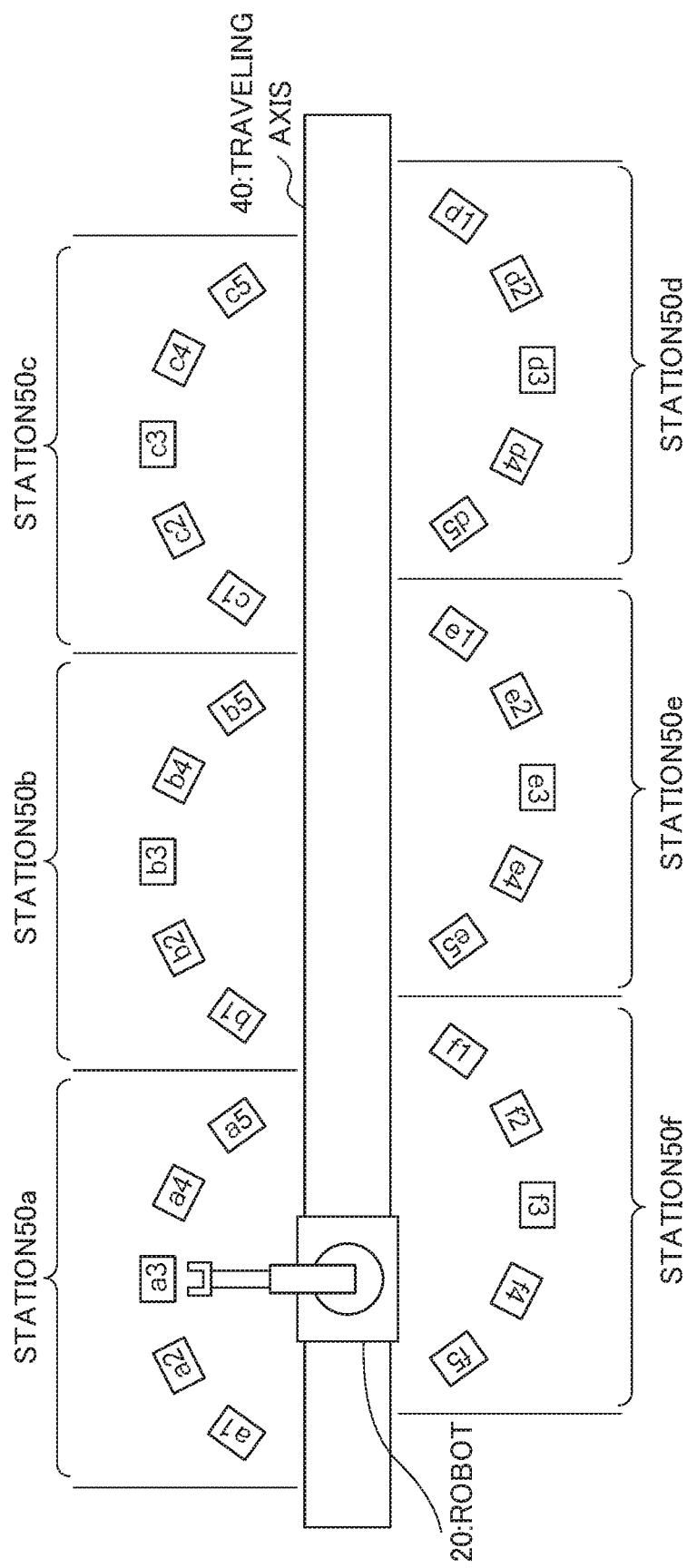
FIG. 12 is a schematic diagram showing an application example of the embodiment of the present invention.

Next, an explanation will be made for an application example of the present embodiment by referencing FIG. 12. FIG. 12 illustrates the robot 20, stations 50*a* to 50*f*, and a traveling axis 40. A plurality of articles (for example, in the case of station 50*a*, articles a1 to a5) is arranged at the stations 50*a* to 50*f*.

Then, the robot 20 can move to each article of the respective stations 50 by moving along the traveling axis 40, and perform predetermined jobs at each station 50. Under such conditions, the robot 20 may perform similar jobs at each of the plurality of stations 50 at which similar articles are arranged.

In such a case, for the jobs at each of the respective stations 50, it is considered to generate an operating program corresponding to the respective job. However, since similar jobs are performed at each of the stations 50, it is wasteful to generate several of the same operating program. Therefore, the input of contents of the work procedure manual is accepted from the user simply once. Then, it has been considered to generate an operating program based on this input, copy this operating program as a model, and use for the jobs of each of the stations 50.

However, although the configurations of the stations 50*a* to 50*f* are basically the same, it is realistically difficult to put each article at identical arrangements with high precision in each station. For this reason, strictly speaking, the relative positions of each article relative to the robot 20 are not the same. Therefore, it is not possible to apply the same robot operating program as is to each station 50.

Therefore, in each of the respective stations 50, the measurement of the reference point Ref is performed by the camera 30, and the control of the robot 20 is performed such that the relative relationship between the reference point Ref and camera enters a predetermined state. It is thereby possible to correct the movement positions in the operating program for each of the respective stations 50, whereby separate operating programs suited to each of the stations 50 will ultimately be completed.

Herein, if employing a method such that copies the operating program as a model, the number of times of the user inputting the contents of the work procedure manual for creating the operating program may be simply once. In other words, while the number of stations 50 is several, the labor of the user will not increase; therefore, it becomes possible for startup the robot system efficiently.

In addition, even if a condition such that the position of the article arranged in the vicinity of another robot 20 changes frequently, by performing measurement of the reference point Ref by the camera 30 every time the position of the article changes, and performing control of the robot 20 such that the relative relationship between the reference point Ref and camera becomes a predetermined state, it becomes possible to repeatedly use an operating program once created.

Comparison with Other Technologies of Present Embodiment

Next, the characteristics of the present embodiment will be explained while carrying out comparison with a common teaching method. The manipulation/operation for training a job having any intention to the robot is called (robot) teaching. Herein, there are several methods such as the following (1) to (3) as methods for performing teaching herein, for example.

(1) The most primitive method is the teaching playback method done while jog operating the robot. As basic functions of the robot, there is what is called a jog operation of moving a predetermined joint axis in positive/negative directions by a manual manipulation using a teaching control panel, moving the end effector of the robot in X+/− directions, Y+/− directions and Z+/− directions within the virtual Cartesian coordinate system space, or changing the posture of the end effector by a predetermined rule. Using this, the robot is appropriately moved on the factory floor on which the robot is placed, the movement destination position is stored, and movement and storage are repeated. After a series of robot operations and storage thereof has ended, the contents just stored are reproduced.

(2) As another method, there is teaching playback done while hand-guide (hand guidance) manipulating the robot. In place of the jog operation using the teaching control panel, an operator directly pushes and pulls to move the end effector of the robot and/or the robot body. A force sensor, torque sensor, etc. are incorporated in the vicinity of the end effector, joint axis of the robot, etc., an external force received by the robot is detected, and the robot is controlled to moved as if the operator were guiding the robot. Upon moving the robot by such a method, the movement destination position is stored. This is also a type of teaching playback.

(3) As yet another method, there is off-line programming. A type of simulation system is constructed on a computer, and a virtual space which reproduces the environment in which the robot is used therein virtually, and a virtual robot corresponding to this robot are defined/set, and an operating program for the robot is created on this simulation system.

The aforementioned methods of (1) and (2) create operating programs for robots using a real robot on the actual factory floor; however, off-line programming is able to create an operating program without using these (actual hardware). For this reason, there is a merit in that the trial and error in programming is easy to do, due to creation of the operating program of the robot being possible from a stage without actual hardware, and being able to relatively easily change the contents of the virtual space (type, installation location, etc. of the robot and peripheral equipment). In contrast, the methods of (1) and (2), such trial and error is relatively difficult.

Although there is superiority in the off-line program in this way, the operating program for a robot created by the off-line programming cannot necessarily be applied as is to an actual robot on the actual factory floor, and normally, any adjustment operations becoming necessary is considered a disadvantage. The main reasons for which this "any adjustment operation" becomes necessary are the two of the following (A) and (B).

(A) The robot operating on the simulation system of a computer accurately operates in accordance with the operation commands. More specifically, when giving an operation command so as to move to (X,Y,Z)=(500.0, −50.0, 150.0) in the coordinate system of the robot, a predetermined location of the end effector will correctly reach this position. On the other hand, the actual robot reaches a position which includes error, by the various main causes piling up such as dimensional error in the components constituting the mechanical parts thereof, assembly error, positioning error upon control to make the robot operate, and distortion in the mechanical components due to the influence of gravity.

(B) The robot normally exerts an action on the peripheral equipment and peripheral objects (shall be abbreviated as peripheral equipment, etc.), so as to assemble the article A being gripped by the end effector to the article B being positioned on a work stand. Herein, it is necessary to pay attention to the relative position relationship between the robot and peripheral equipment, etc. Accurately arranging the robot, peripheral equipment, etc. in the field in accordance with the relative position relationships thereof within virtual space on a computer is not easy, and it is not uncommon to be accompanied by error on the extent of several tens of millimeters, for example.

Addressing error happening in this way, the matter of configuring so as to make the robot ultimately reach the appropriate position is the aforementioned "any adjustment operation". This is relatively cumbersome work, and is considered to be a hindrance to the spread of off-line programming. As a method of performing this adjustment operation, methods such as the following (a) to (d) have been considered.

(a) As the most straightforward method, a method can be exemplified of confirming the arrival position of the robot at every teaching point, while reproducing the robot operating program created by off-line programming at low speed with the actual robot, then in the case of this not being appropriate, fine-tuning the arrival positions of the robot by the same method as the above-mentioned (1) or (2), and updating the data of teaching positions. Compared to the methods of the above-mentioned (1) and (2) which start the teaching operation from a state without any operating program, it may be possible to reduce the overall labor of the operation; however, if the number of teaching points is many, the labor for fine-tuning will also become extensive. In addition, there is also a possibility of the robot colliding with the peripheral equipment, etc. depending on the contents of the teaching points prior to fine-tuning. For example, there is a possibility such as the leading end of a spot welding gun caving in vehicle body panels.

(b) A method can be exemplified of identifying the error amount occurring by the main causes of the above-mentioned (A) and (B), and compensating for these. First, addressing the error of (A), the place where causing various movements in a state mounting the end effector to the robot is measured by a three-dimensional measuring instrument installed externally. Several combinations of actual robot arrival positions measured by the three-dimensional measuring instrument with the operation command to the robot are acquired by this method, and a geometric equation for correcting the error amount of mechanical parts and distortion amount due to gravity is derived by analyzing several data sets thereof mathematically. Based on this, predetermined correction is applied to the operation control of the robot, whereby the relative positioning precision of the robot is improved. It should be noted that this method is not necessarily performed on the actual factory floor, and it is possible to perform on solely the robot beforehand at another location.

On the other hand, addressing the error of (B), the robot and peripheral equipment, etc. are arranged in the factory floor, followed by measuring respective three-dimensional positions of a plurality of predetermined points on the robot mechanical parts and a plurality of predetermined points on the peripheral equipment, etc., by the three-dimensional measuring instrument installed externally, and deriving a relative position relationship between the robot and peripheral equipment, etc. from these. This information of the relative relationship is fed back to the simulation device on the computer, the arrangement of the robot and peripheral equipment, etc. is changed within virtual space (i.e. suited to the arrangement of the factory floor), and the operating program of the robot is then reproduced, and this is applied to the robot on the factory floor.

It is configured so as to be able to execute the robot operating program in a state suppressing the measurement error by combining the two methods corresponding to the above-mentioned (A) and (B). However, it must be said that the level of knowledge and technical skill necessitated in order to achieve this is high, and the corresponding labor is significant.

(c) In the case of considering to divide the method of the above-mentioned (b) into a first half of decreasing the error of (A), and a second half of reducing the error of (B), since it is necessary to do work by bringing equipment such as the three-dimensional measuring instrument to the factory floor, and various objects are occasionally present on the factory floor and thus the special restrictions are great, the latter one is cumbersome in terms of labor.

Therefore, it has been considered to simplify only the latter part. More specifically, the technology disclosed in "Japanese Patent No. 3733364" is employed. This technology, although being a method of curbing the labor when relocating an existing robot system at another location, is able to be applied. More specifically, it is sufficient so long as configuring so that, when regarding as "robot system prior to relocation=robot system within virtual space", reference marks for at least three locations are defined at predetermined locations on the peripheral equipment, etc. in virtual space, and the positions of these reference marks relative to a virtual robot are obtained beforehand; and when regarding as "robot system after relocation=robot system on actual factory floor", actual reference marks are provided at positions on the actual peripheral equipment, etc. corresponding to the positions of the reference marks defined in virtual space, and these are measured with an actual robot by the camera. This method has a great effect in curbing the labor of the adjustment operation in a case such that several teaching points exist on one rigid body. For example, spot welding on vehicle body components, etc. is a typical example.

Conversely, in a case such that a plurality of peripheral equipment, etc. is arranged in the vicinity of the robot separately, reference marks of at least three locations must be provided to each and measurement work must be performed, and thus the labor curbing effect declines. If becoming a case where the number of teaching points on the respective peripheral equipment is few, the curbing effect will further decline. For example, if a case such that there are ten pieces of peripheral equipment, etc., and the teaching points are only one per each, since reference marks must be provided to 3×10=30 locations for automatic adjustment of the teaching points of a total of 10 points, and these must be measured by camera, the labor returns to increasing.

(d) It has also been considered to employ the technology disclosed in "Japanese Unexamined Patent Application, Publication No. H7-325611". With this technology, the markers are measured by a camera mounted to the leading end of the end effector for every spot of spot welding, and the data for teaching positions is updated upon adjusting the position of the robot. The portion making modifications of the teaching points by manual operation in the above (a) can be perceived as automated by employing the camera. By using the camera, a certain extent of distance between the spot welding spot and camera is ensured, whereby the risk of collision inherent to the above (a) declines. In addition, although the labor of manual procedures by the operator is curbed, the total time for adjustment in order to adjust all spots by the camera does not shorten.

Various technologies have been explained above. Herein, for the teaching points of the robot in the operating program created by off-line programming, adjustment operations for the teaching points are necessary with the actual robot on the factory floor.

For this reason, adjustment operations are performed by methods such as the aforementioned (a) to (d). Herein, the adjustment operation normally is performed only one time upon startup of the robot system, and only reproduces merely the completed robot operating program thereafter. In other words, so long as the arrangements of the robot and peripheral equipment, etc. are determined tentatively, these not changing thereafter is a major premise. In addition, the operation target workpiece which is replaced every time must be positioned accurately. If being a production facility such that these are satisfied, although there are merits and disadvantages in each of the methods (a) to (d), it is considered to exhibit a certain usefulness for all. In a mass production-type production facility such as the vehicle body production line of automobiles in particular, it has been considered that methods (c), (d), etc. are useful in the curbing of labor.

However, production facilities of different configurations than this also exist around the world, and there are also facilities where these technologies will not effectively function. For example, in the case of there being a situation such that the relative relationship between the robot and peripheral equipment, etc. changes every time, if trying to rely on the methods of (a), (b) and (d), the adjustment operation must be performed every time and will not be helpful.

On the other hand, there is a possibility of being able to handle if the method of (c). For example, in the case of a production facility such that a robot spot welds on vehicle body panels, even if there were a situation such that the positions of the vehicle body panels changed every time, so long as being able to measure the visual marks of at least three locations linked with positions on the vehicle body panels by camera, it is considered to be able to handle the changes every time.

However, in the case of the number of articles being several, and being a situation such that the positions of these change every time as mentioned above, handling will be difficult even if the method of (c). In particular, with the configuration of the description such as that explained by referencing FIG. 12, handling is difficult with the methods of (a) to (d). This is because, when assuming to perform a method of adjustment operation illustrated by the above (c) despite being the reason thereof, visual marks of at least three locations for each of all of the respective articles a1, a2, . . . , f5 (thirty) must be provided and measured by camera, and thus the efficiency will be poor. In particular, in the case of the number of teaching points being few for the respective articles, it becomes still more inefficient.

However, if an embodiment such as that illustrated in the invention of the present disclosure as mentioned above by referencing FIG. 12, since done by measurement by camera on visual marks at one location for each of the respective articles, it is efficient. For this reason, according to the present embodiment, even in a case of the robot system such as that shown in FIG. 12 being the target, an effect is exerted in being able to perform startup of the system very efficiently and with little labor.

EXPLANATION OF REFERENCE NUMERALS

- 10 programming device
- 11 input unit
- 12 output unit
- 13 program generation unit
- 14 robot control unit
- 15 movement destination point correction unit
- 16 image acquisition unit
- 20 robot
- 21 drive control unit
- 22 base part
- 23 first joint
- 24 first arm
- 25 second joint
- 26 second arm
- 27 gripper
- 30 camera
- 31 image capturing unit
- 40 traveling axis
- 50 station

What is claimed is:

1. A robot control method performed by a computer, comprising the steps of:

generating a program for causing a predetermined operation which passes through a plurality of movement destination points to be executed by a robot;

executing the predetermined operation by the robot according to control based on the program;

acquiring a photographed image capturing a reference point which is disposed at a position having a predetermined relative relationship with a position of the movement destination point; and correcting information of the movement destination point included in the program, based on the photographed image and the predetermined relative relationship, wherein, in the step of generating a program, a plurality of movement destination points specified based on information grouping a position of the reference point and the predetermined relative relationship are stored as candidates for the movement destination point, wherein, in the step of generating a program, any movement destination point is selected from the candidates for the movement destination point, and a program is generated for causing a predetermined operation passing through the movement destination point thus selected to be executed by the robot, during program generation, and wherein the robot is controlled based on corrected information of the movement destination point, in the step of executing.

2. A programming device comprising:

a program generation unit that generates a program for causing a predetermined operation passing through a plurality of movement destination points to be executed by a robot;

a robot control unit that causes the predetermined operation to be executed by the robot according to control based on the program;

an image acquisition unit that acquires a photographed image capturing a reference point that is arranged at a position having a predetermined relative relationship with a position of the movement destination point; and a movement destination point correction unit that corrects information of the movement destination point included in the program, based on the photographed image and the predetermined relative relationship, wherein the program generation unit stores a plurality of movement destination points specified based on information grouping a position of the reference point and the predetermined relative relationship, as candidates for the movement destination point, and wherein the program generation unit selects any movement destination point from the candidates for the movement destination point, and generates a program for causing a predetermined operation passing through the movement destination point thus selected to be executed by the robot, during program generation, and wherein the robot control unit controls the robot based on corrected information of the movement destination point.

3. The programming device according to claim 2, wherein the program generation unit, in a case of the robot and another article interfering if the robot moves between the movement destination points, generates the program by inserting a relay point passed through during movement between the movement destination points, so that the robot moves on a path on which the interfering does not occur.

4. The programming device according to claim 3, wherein the movement destination point correction unit does not correct information for the relay point.

5. The programming device according to claim 2, wherein the movement destination point correction unit, while the robot is executing the predetermined operation, corrects information for movement destination points through which the robot subsequently moves.

6. The programming device according to claim 2, wherein a plurality of the reference points is present, and image information for identifying respective reference points is included in each of the reference points, wherein the image acquisition unit also captures image information for identifying the respective reference points, and wherein the movement destination point correction unit identifies a reference point based on image information for identifying the respective reference points, and corrects information of the movement destination point corresponding to the reference point thus identified which is included in the program, based on the photographed image and the predetermined relative relationship.

* * * * *